(12) United States Patent
Westphal

(10) Patent No.: US 7,546,289 B2
(45) Date of Patent: Jun. 9, 2009

(54) SYSTEM AND METHOD FOR PROVIDING A RESPONSE TO A SEARCH QUERY

(75) Inventor: Geoffry A. Westphal, Park Ridge, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 428 days.

(21) Appl. No.: 11/126,761

(22) Filed: May 11, 2005

(65) Prior Publication Data

US 2006/0259467 A1 Nov. 16, 2006

(51) Int. Cl.
G06F 17/30 (2006.01)
(52) U.S. Cl. .............................................. 707/3; 707/4
(58) Field of Classification Search ..................... 707/3, 707/4
See application file for complete search history.

(56) References Cited

U.S. PATENT DOCUMENTS

| | | | | |
|---|---|---|---|---|
| 5,802,510 | A * | 9/1998 | Jones | 707/2 |
| 5,978,799 | A * | 11/1999 | Hirsch | 707/4 |
| 6,134,548 | A * | 10/2000 | Gottsman et al. | 707/5 |
| 6,144,958 | A * | 11/2000 | Ortega et al. | 707/5 |
| 6,169,986 | B1 * | 1/2001 | Bowman et al. | 707/5 |
| 6,226,649 | B1 * | 5/2001 | Bodamer et al. | 707/104.1 |
| 6,317,722 | B1 * | 11/2001 | Jacobi et al. | 705/14 |
| 6,418,441 | B1 * | 7/2002 | Call | 707/10 |
| 6,438,539 | B1 * | 8/2002 | Korolev et al. | 707/3 |
| 6,651,052 | B1 * | 11/2003 | Westphal | 707/3 |
| 6,728,706 | B2 * | 4/2004 | Aggarwal et al. | 707/5 |
| 6,763,351 | B1 * | 7/2004 | Subramaniam et al. | 707/3 |
| 6,785,671 | B1 * | 8/2004 | Bailey et al. | 707/3 |
| 6,917,941 | B2 * | 7/2005 | Wight et al. | 707/10 |
| 6,928,446 | B2 * | 8/2005 | Westphal | 707/101 |
| 6,996,538 | B2 * | 2/2006 | Lucas | 705/28 |
| 7,080,070 | B1 * | 7/2006 | Gavarini | 707/5 |
| 7,152,059 | B2 * | 12/2006 | Monteverde | 707/3 |
| 2001/0021914 | A1 * | 9/2001 | Jacobi et al. | 705/8 |
| 2002/0013781 | A1 * | 1/2002 | Petersen | 707/10 |
| 2002/0024532 | A1 * | 2/2002 | Fables et al. | 345/700 |
| 2002/0077929 | A1 * | 6/2002 | Knorr et al. | 705/26 |

(Continued)

FOREIGN PATENT DOCUMENTS

WO       WO 02/27604 A2 *   4/2002

OTHER PUBLICATIONS

Lu, Hongjun, et al., "Integrating Database and World Wide Web Technologies", World Wide Web, vol. 1, No. 2, Jun. 1998, pp. 73-86.*

(Continued)

Primary Examiner—John E Breene
Assistant Examiner—Robert Stevens
(74) Attorney, Agent, or Firm—Greenberg Traurig, LLP

(57) ABSTRACT

A system receives a request to search an electronic catalog of a vendor which specifies a query term. The query term is used to search an electronic catalog of a third party. The results obtained by searching the electronic catalog of the third party are parsed to uncover a keyword recognized by a search engine associated with the electronic catalog of the vendor. The uncovered keyword is then used in the search engine associated with the electronic catalog of the vendor to locate one or more items in the electronic catalog of the vendor. Items located in this manner are the search results responsive to the query term.

15 Claims, 16 Drawing Sheets

U.S. PATENT DOCUMENTS

| | | | |
|---|---|---|---|
| 2002/0103789 A1* | 8/2002 | Turnbull et al. | 707/3 |
| 2002/0103871 A1* | 8/2002 | Pustejovsky | 709/206 |
| 2002/0107718 A1* | 8/2002 | Morrill et al. | 705/10 |
| 2002/0111873 A1* | 8/2002 | Ehrlich et al. | 705/26 |
| 2002/0120527 A1* | 8/2002 | Lam et al. | 705/26 |
| 2002/0138481 A1* | 9/2002 | Aggarwal et al. | 707/6 |
| 2002/0152204 A1* | 10/2002 | Ortega et al. | 707/3 |
| 2003/0074301 A1* | 4/2003 | Solomon | 705/37 |
| 2003/0083958 A1* | 5/2003 | Song et al. | 705/27 |
| 2003/0083959 A1* | 5/2003 | Song et al. | 705/27 |
| 2003/0093337 A1* | 5/2003 | Song et al. | 705/27 |
| 2003/0105680 A1* | 6/2003 | Song et al. | 705/27 |
| 2003/0144924 A1* | 7/2003 | McGee | 705/27 |
| 2003/0185379 A1* | 10/2003 | O'Connor et al. | 379/265.02 |
| 2003/0195877 A1* | 10/2003 | Ford et al. | 707/3 |
| 2003/0200155 A1* | 10/2003 | Ouchi | 705/27 |
| 2004/0030690 A1* | 2/2004 | Teng et al. | 707/3 |
| 2004/0093330 A1* | 5/2004 | Westphal | 707/3 |
| 2005/0027611 A1* | 2/2005 | Wharton | 705/26 |
| 2005/0154651 A1* | 7/2005 | Bezos et al. | 705/27 |
| 2005/0222987 A1* | 10/2005 | Vadon | 707/3 |
| 2006/0041562 A1* | 2/2006 | Paczkowski et al. | 707/10 |
| 2006/0282304 A1* | 12/2006 | Bedard et al. | 705/10 |
| 2007/0124216 A1* | 5/2007 | Lucas | 705/27 |

OTHER PUBLICATIONS

Schafer, J. Ben, et al., "E-Commerce Recommendation Applications", Data Mining and Knowledge Discovery, vol. 5, Nos. 1-2, Jan. 2001, pp. 115-153.*

Paik, Incheon, et al., "An Affiliated Search System for an Electronic Commerce and Software Component Architecture", Information and Software Technology, vol. 45, Issue 8, Jun. 2003, pp. 479-497.*

Microsoft Computer Dictionary, 5th Edition, Microsoft Press, Redmond, WA, © 2002, pp. 141, 260, 474 and 564.*

* cited by examiner

"http://www.google.com/froogle?q=40245","google.com",".com","Froogle Search: 40245","","","" My Shopping List Web Images Groups News Froogle Local New! more» AdvancedFroogleSearch Preferences Froogle Results 1 - 10 of about 212 confirmed / 315 total results for 40245 . ( 0.14 seconds) View > List view Grid view Sort By > Best match Price: low to high Price: high to low Price Range $ to $ Search within > All Categories Home & Garden Home Improvement Tools Tool Storage Search by store AlwaysLowest Ambry Bottom Line Telecomm.. BuyKimco.com Digitally Unique Go Collect ITC Electronics PROVANTAGE RockAuto.com Auto .. SaleOnAll.com Tower Hobbies Unistar-Sparco .. Akro-Mils Divider for Bin 30240, 30250 - 40245 $10.45 - ITC Electronics Add to list e=hidden name=Price value=$10.45> Dorman 40245 $3.10 - RockAuto.com Auto Parts: Reviews Add to list hidden name=Price value=$3.10> Atlas RS3 Providence & Worcester 164 N 40245 $76.99 - Tower Hobbies: Reviews Add to list AAAAAAAAAAA> NO DESCRIPTION CURRENTLY AVAILABLE. Cables To Go 40245 98.5ft Break-apart Vga Cable M/f Requires ... $77.33 - Bottom Line Telecommunications Add to list A> 40245 98.5FT BREAK-APART VGA CABLE M/F REQUIRES PIGTAIL UPC #757120402459 > CABLES TO GO 40245 98.5FT BREAK-APART VGA CABLE M/F REQUIRES PIGTAIL UPC #757120402459 $74.37 - Unistar-Sparco Computers : Reviews $90.35 - SaleOnAll.com Compare 6 items priced from $74.37 - $95.95 » Cables to Go 40245 98.5' Break-Apart SVGA M/F $79.95 - Digitally Unique: 4.0/5 Add to list den name=Price value=$79.95> 98.5' Break-Apart SVGA M/F 98.5-ft Break-apart SVGA Cable M/F # 40245 by Cables To Go $63.54 - PROVANTAGE: 4.2/5 Add to list UGajmLlRuCb1EhSKrRtXHz2vLRIJM5w0hSbOKcpquw4AAAAAAAAAAA> 40245 (cables to) monitor cables. The company cables to go manufactures 98.5-ft break-apart svga cable m/f under the group ... > Part # 40245 (cables to) monitor cables. The company cables to go manufactures 98.5-ft break-apart svga cable m/f under the group ... AkroBin Dividers $11.16 - BuyKimco.com Add to list n name=Snippet value=for 30240, 30250 - 6/pkg. Excellent way to maximize the use of your AkroBins! > for 30240, 30250 - 6/pkg. Excellent way to maximize the use of your AkroBins! This Little Piggy - Marie Osmond Collectible Dolls - Nursery Rhyme ... $108.78 - Go Collect Add to list 8gFFUzkgW2gvrol6aPcxbLeVnwRQcEGb8AAAAAAAAAAA> ... her own little piggy's (toes). Limited Edition of 5000 This Little Piggy - Marie Osmond Collectible Dolls - Nursery Rhyme - 40245 > ... her own little piggy's (toes). Limited Edition of 5000 This Little Piggy - Marie Osmond Collectible Dolls - Nursery Rhyme - 40245 40245 $76.45 - AlwaysLowest: 3.2/5 Add to list dden name=Price value=$76.45> 98.5FT BREAK-APART SVGA M/F CABLE C1676-40245 Cartridge Cap - Keeps Cartridges From Drying Out When ... $26.00 - Ambry Add to list sb4OWq9vYlrNm7FOV_2SIk5c8ASuAAAAAAAAAAA> ... > Cartridge Cap - Keeps Cartridges From Drying Out When Carriage is Parked in the Service Station - For Printers With a Serial Number Prefix of USB, USC and SGC ... ResultPage: 1 2 3 4 5 6 7 8 9 10 Next Sponsored Links Electronic Components ASI is a worldwide manufacturer of RF transistors and Microwave Diodes www.adsemi.com Find Homes in 40245 Search the 40245 MLS Find Current Listings for Free! aff www.SearchTheNationalMLS.com Find 40245 Locate the above zip code in the our database. www.PrivateEye.com See your message here... Froogle does not charge for inclusion in its search results nor accept payment for better placement. To list your products in Froogle, please upload your product catalog. InformationforMerchants | FroogleHelp GoogleHome - AdvertisingSolutions - BusinessSolutions - AboutGoogle ©2005 Google","","39403"

FIGURE 6

1A004
Commercial Temperature Control, Full Load Current 24 Amps, Electrical Ratings
120 Volts, Locked Rotor Current 144 Amps, Pilot Duty Power Rating 720 Volt
Amps, High Event Range 25 to 75 Degrees Fahrenheit, High End Differential
Temperature 3-20 Degrees Fahrenheit, Low End Differential Temperature 6-25
Degrees Fahrenheit, Sensing Element 3/8 x 1 3/8 Inches, Sensing Element
Capillary Length 72 Inches, Adjustable, 2 x 3 1/2 x 2 3/4 Inches 1A005
Commercial Temperature Control, Input Voltage 120 Volts, High Event Range 0
to 55 Degrees Fahrenheit, High End Differential Temperature 3-20 Degrees
Fahrenheit, Low End Differential Temperature 6-25 Degrees Fahrenheit, Sensing
Element 1 1/4 x 1 1/2 Inches, Adjustable, 2 x 3 1/2 x 2 3/4 Inches

FIGURE 7

Product Index         Abrasive — Adapters

A

ABRASIVE
- Backings, Rubber Drum .....3089
- Bear-Tex Bushings ........3078
- Belt and Disc Cleaners ......3090
- Bore Polishers ............3088
- Cleaners ................1598
- Diamond Blades ......1303, 1318
- Dressing Tools ............3037
- Drum Sanding Kits ........3090
- Flap Brushes ............3080
- Hoses ...................2954
- Rubbing Bricks .......1055, 3039
- Sharpening Stones ...3038 - 3040
- Spiral Bands .............3089
- Sponges ................3081
- Star Tips ................3061
- Surface Paint ............2734
- Test Kits ............3087, 3090
- Wheel Adapters ...........3043
- Wire Brushes ...3091, 3092, 3094, .................3096, 3097

ABRASIVE BELTS,
- Bear-Tex ................3078
- Cloth ............3069 - 3071
- Surface Conditioning ......3069

ABRASIVE BLASTERS
...............2955 - 2957

ABRASIVE BLASTING
- Cabinet Accessories ........2954
- Cabinets ................2955
- Guns ................2956, 2957
- Media ...................2957
- Nozzles ........2954, 2956, 2957

ABRASIVE DISCS,
- Automotive ..............3055
- Bear-Tex ...3052, 3067, 3079, 3081

- Power-Lock ....3053, 3056 - 3058
- PSA ........3058, 3062 - 3064
- Quick-Loc ................3051
- Speed-Grip .........3065, 3067
- Speed-Lok ......3054, 3055, 3067
- Surface Conditioning . .3051, 3053
- Vacuum Hole ..............3065

ABRASIVE HOLDERS,
- Disc Pad ................3053
- Power-Lock ..........3056, 3057
- Quick-Lock ..............3051

ABRASIVE MANDRELS,
- Bore Polisher ............3088
- Cartridge ................3089
- Disc ......3050, 3061, 3076, 3090

ABRASIVE PADS,
- Backup .. 3051, 3052, 3060, 3061, .................3067, 3083
- Bear-Tex Hand ...........3081
- Hand ...................3080

ABRASIVE ROLLS,
- Cartridge ................3090
- Clean and Finish ..........3080
- Cut and Polish ...........3080
- Disc .............3054, 3066
- Handy .............3074, 3075
- Plumber's ................3075
- Shop ...................3075
- Spiral ..................3089
- Utility ..................3074
- Vacuum Hole Disc ........3064

ABRASIVE SHEETS,
- Hand Block ..............3080
- Sandpaper......3055, 3072, 3073

ABRASIVE WHEELS,
- Bear-Tex ................3077
- Bear-Tex Flap ............3078
- Bench ..................3039
- CBH ...................3036

- Deburring ..........3053, 3076
- Diamond ............1318, 3036
- Finishing ................3076
- Flap .............3085 - 3088
- Grinding .....3033 - 3035, 3052
- Mounted ..........3082, 3083
- Pedestal ................3030
- Portable ...........3041, 3042
- Toolroom .........3033 - 3035
- Wire ...................3096

ABRASIVES,
- AVOS .............3052, 3083
- Blasting .................2957
- Bonded ............3033, 3034
- Coated ........3060, 3065, 3073
- Depressed Center ....3041, 3052
- Nonwoven ...............3051

AC TO DC CONVERTERS
.................337, 484

ACCESS DOORS,
- Duct ...................3564
- Fire-Rated ...............1678
- Steel ...................1678

ACCUMULATOR
- Brackets ................1566
- Charging Kits ............1566
- Clamps .................1566
- Repair Kits..........1566, 1567
- Valves ..................1566

ACCUMULATORS,
- Bladder ................1566
- Hydraulic...........1566, 1567

ACETYLENE
- Regulators ...............3137
- Tips ...................3124
- Torch Tips ..............3124
- Torches ......3124, 3141, 3143

ACID
- Aprons .................2607

- Pumps ....3287, 3288, 3290 - 3292, ..............3317, 3320
- Sprayers .................1072
- Test Kits ............3616, 3619

ACID,
- Battery ..................3176

ACOUSTICAL
- Baffles ..................2530
- Foam .............2531, 2872
- Panels ..................2530
- Screens .................2531
- Wall Blankets ............2531

ACRYLIC
- Coatings ............1760, 2490
- Paints ..............1752, 1760

ACTIVATORS,
- Floor Coating .........1762, 1764
- Paint .........1762, 1764, 1766

ACTUATOR
- Ball Joints ...............3480
- Devices ..................353

ACTUATORS,
- Damper ................3485
- Lever ..................1463
- Limit Switch .........436, 438
- Linear ..............232 - 235
- Pneumatic ..........1434, 1463
- Roller Lever ........1463, 1542
- Rotary ................1542
- Valve ..................1463

ADAPTER
- Kits, Speed Reducer ........229
- Plates, 4-PLEX ............513
- Plates, HubbleBock .........524

ADAPTERS,
- Air Conditioner ...........3579
- Arbor Hole ..............3092
- Bare Wire ................503
- Bayonet Thermocouple ......3507

FIGURE 8

Manufacturer & Brand Index — Abanaki – American Water Service

ABANAKI
Coolant Mists ............ 2935
Coolant Mixers ........... 2935
Oil Skimmer Belts ........ 2935
Oil Skimmers ............. 2935

ABB MOTORS
Metric Motors .......... 41 - 43

ABCO PRODUCTS
Brooms ................... 1711
Mop Frames ............... 1709
Mop Handles ........ 1705, 1709
Mop Heads ................ 1705

ACORN
Corrugated Boxes ......... 2279

ADJUST-A-LINK
Chain Slings ............. 2117

ADVANCE CONTROLS
Disconnect Switches ....... 345
Switches ............. 384, 385

ADVANCE TRANSFORMER
Ballasts ......... 693, 695 - 697,
............ 699, 701 - 703, 705, 706

ADVANCED TECHNOLOGY PRODUCTS
Tubing ................... 1523

ADVANTAGE PLUS
Drill Drifts .............. 977
Mega Mag Indicator Holders ... 921
Milling Table Accessories ... 2975
Test Indicator Holders .... 918
Thread Measuring Wire Sets ... 923
Transfer Punch Sets ...... 1030

ADVIL
Pain Relievers ........... 2671

AEMC
Data Loggers ....... 1141, 1144
Earth/Ground Leads ....... 1150
Earth/Ground Testers ... 1150, 1151
Kelvin Clips ............. 1151
Kelvin Probes ............ 1151
Megohmmeters ....... 1146 - 1149
Micro-Ohmmeters .......... 1151
Power Quality Analyzers ... 1145

AERO-MOTIVE

Hydraulic Hose Adapters
................... 1562, 1563
Hydraulic Hose Assemblies
................... 1560, 1561
Hydraulic Hose Fittings .. 1560, 1563
Hydraulic Hoses ......... 1560
Hydraulic Pipe Thread Adapters
................... 1566, 1572

AFC CABLE SYSTEMS
Armored Cables ............ 578

AGRI-FAB
Dump Carts ............... 1065
Spreaders ................ 1064
Tractor Attachments ...... 1065

AIGNER INDEX
Label Holders ..... 2143, 2171,
................... 2173, 2191
Magnetic Labels .......... 2143

AIPHONE CORP.
Audio and Video Door Access
Controls ................. 2732
Communications Equipment .. 2273
Door Strikes ............. 2273
Power Supplies ........... 2273

AIR DRIVE
Fan Blades ............... 3744

AIR HANDLER
Air Filter Frames ........ 3663
Air Filters ..... 3649, 3658 - 3671
Paint Liner Paper ........ 3671

AIR KING
Fan Stands ............... 3673
Fans .............. 3672 - 3676
Heaters ........... 3510, 3511
Humidifier Filters ....... 3644
Humidifiers .............. 3644

AIR SYSTEMS INTERNATIONAL
Air Ducts ................ 2634
Air Filter Kits .......... 2557
Air Filters .............. 2557
Air Pumps ................ 2557
Blower Kits .............. 2634
Blowers ........... 2635, 2636
Calibration Kits ......... 2557
Compressor Filters ....... 2557

Ventilation Kits ......... 2634

AIR VENT INC.
Fan Switches ............. 3702
Fans .............. 3702, 3703
Ventilator Dampers ....... 3699
Ventilators ........ 3699 - 3701

AJAX
Cleansers ................ 1598

AJAX TOOLS
Air Tools and Accessories .. 1375,
................... 1377, 1379

AK LIMITED
Earplug Dispensers ....... 2510
Eyewear Dispensers ....... 2510
Eyewear Holders .......... 2510
Glove Dispensers ......... 2510
Suggestion Boxes ......... 2510

AKRO-MILS
Bench Racks .............. 2188
Bin Carts .......... 2188, 2190
Bin Cups ................. 2189
Bin Dividers ....... 2189, 2192
Bin Mounting Panels ...... 2188
Bin Racks ................ 2188
Grounding Wire ........... 2190
Part Storage Cabinets .... 2196
Rack Bin Mobile Kits ... 2188, 2381
Rotabins ................. 2201
Shelf Bins ............... 2189
Shipping Containers ...... 2193
Stack & Nest Container Lids .. 2192
Stack and Nest Containers .. 2192
Stacking Containers ...... 2193
Storage Bins ....... 2188, 2190,
................... 2191, 2196
Tote Box Dividers ........ 2192
Tote Box Lids ............ 2192
Tote Boxes ............... 2192
Utility Carts ............ 2381

ALARM LOCK
Battery Packs ............ 2768
Exit Alarm Cylinders ..... 2769
Exit Door Alarms ..... 2768, 2769
Exit Door Locks .......... 2769
Mortise Cylinders ........ 2768
Push-Button Locks ........ 2769

Floor Locks .............. 2361
Wheels ..... 2351 - 2352, 2359, 2360

ALC/SANDY JET
Abrasive Blasters ........ 2956
Abrasive Blasting Guns ... 2956
Abrasive Blasting Nozzles ... 2956
Siphon Blasters .......... 2956
Siphon Gun Kits .......... 2956

ALEMITE
Grease Fittings .... 2912, 2913
Grease Guns .............. 2908

ALKA SELTZER
Antacids ................. 2671

ALLIANCE HOSE & RUBBER CO.
Chemical Hoses ........... 1517
Discharge Hoses .... 1515, 3208
Suction Hoses ...... 1518, 3209

ALLIBERT/CONTICO
Container Lids ........... 2203
Container Pallets ........ 2145,
................... 2202, 2431
Containers ............... 2203

ALNOR
Air Quality Meters ....... 1183
Anemometers ........ 1212, 1214
Balometers ............... 1215
Manometers ............... 3262
Velometers ............... 1213

ALPHA
Electronic Message Signs ... 2262

ALPINE
Evaporative Coolers ...... 3602

ALSONS
ADA Bar Units ............ 3422
Hand Shower Hoses ........ 3422
Hand Shower Wall Mounts ... 3422
Shower Arm Mounts ........ 3422
Shower Heads ............. 3422
Shower Hoses ............. 3422
Showers .................. 3422

ALUMINUM LADDER CO.
Modular Work Platforms ... 2034

AMANO CINCINNATI
Time Clocks .............. 2258

FIGURE 9

Froogle Web Images Groups News Froogle Local^(New!) more »

[40245]    Search Froogle | Search the Web    Advanced Froogle Search
Preferences My Shopping List

Froogle    Results 1 - 10 of about 224 confirmed / 345 total results for 40245. (0.12 seconds)

View
> List view
  Grid view
Sort By
> Best match
  Price: low to high
  Price: high to low
Price Range
$ [    ] to
$ [    ] Go
Search within
> All Categories
  Home & Garden
    Home Improvement
      Tools
        Tool Storage
Search by store
  Beach Audio
  Build Your Own...
  Computer Brain
  Datashapes
  Digitally Unique
  DiscountPCSource
  ITC Electronics
  MPSuperstore
  nice electronics
  PROVANTAGE
  RockAuto.com Auto...
  SHENTECH.COM
  Tower Hobbies Image not available

Akro-Mils Divider for Bin 30240, 30250 - 40245
$10.45 - ITC Electronics  Add to list

Cables to Go 40245 98.5' Break-Apart SVGA M/F
$70.95 - Digitally Unique: 4.0 / 5  Add to list
98.5' Break-Apart SVGA M/F
$64.24 - Computer Brain: Reviews
$70.99 - Beach Audio: 4.4 / 5
Compare 8 items priced from $63.44 - $91.99 »

Image not available

Akro-Mils #40245 Akrobin Divider For 30240 & 30250
$9.86 - Datashapes  Add to list
Akro-Mils #40245 Akrobin Divider For 30240 & 30250

Cables to Go 40245 98.5' Break-Apart SVGA M/F
$111.95 - Datashapes  Add to list
CABLES TO GO 40245 98.5' Break-apart SVGA M/f
$70.80 - DiscountPCSource
$78.74 - Build Your Own Computer
Compare 12 items priced from $64.95 - $111.95 »

Dorman 40245
$3.10 - RockAuto.com Auto Parts: Reviews  Add to list

Image not available

Atlas RS3 Providence & Worcester 164 N 40245
$76.99 - Tower Hobbies: Reviews  Add to list
NO DESCRIPTION CURRENTLY AVAILABLE.

Sponsored Links

Do you live in 40245
See if your area is eligible
Get free Starbucks for a year
starbucks.getmyanswers.com Pricing & Info
Special Corporate & Government Price
Worldwide Shipping. Order Now!
TrioComputers.com Compare Prices
Search for Low Prices on
Computers & Consumer Electronics
www.SmarterDeals.com Find Homes in 40245
Search the 40245 MLS
Find Current Listings for Free! aff
www.SearchTheNationalMLS.com Search for 40245
Find the above zip
code in our database.
www.PrivateEye.com See your message here...

FIGURE 10

GRAINGER.

Home | Order Form | Compare Items | Register | Your Account | Help

Repair Parts | Services | Resources | Company Info | Contact Us | Find A Branch | Worldwide Catalog No. 396 (PDF)   Keyword(s)    Advanced Search

LOG IN

User ID

Password

☐ Remember my login more ⌄

Search Results

719 Product Matches

Refine Your Search ⚲ Advanced Search

Product Comparison

Search these results ⦿ New search ⦾

Keyword(s)

COMPARE Products ONLINE Compare Products Online! Compare Multiple Products Side-by-Side on One Web Page Make Informed Decisions with Complete Product Information ▸ Search for Repair Parts
You searched > Keywords: bin Results Displayed: 1 - 15 of 719                                  Results Page: 1 2 3 4 5 Next ▸

Compare Items | Add to Order | Add to Personal List | Clear    Sort Table By: Default

| Select | Item # | Enter Qty. | Notes | Description | Manufacturer Model # | Ship Qty. | Usually Ships ** | Unit Price | Catalog 396 Page |
|---|---|---|---|---|---|---|---|---|---|
| ☐ | 4TJ74 | | [N] | Stak-N-Store Bin, Outside Top Length 15 1/4 In, Outside Top Width 19 7/8 In, Outside Top Depth 12 7/16 In, Capacity 15 Cu Ft, Gray. Only shipped in quantities | AKRO-MILS 13-017 | 3 | Today | $10.42 | 2191 |
| ☐ | 3AJ51 | | [N] | Plastic Stacking Bin, Blue, Molded Carrying Handle, Depth 20 Inches X Width 12 3/8 Inches X Height 12 inches | AKRO-MILS 30282BLUE | 1 | Today | $12.98 | 2190 |
| ☐ | 3AJ63 | | [N] | Plastic Stacking Bin, Blue, Molded Carrying Handle, Depth 29 1/4 Inches X Width 18 3/8 Inches X Height 12 Inches | AKRO-MILS 30290BLUE | 1 | Today | $24.60 | 2190 |

FIGURE 14

GRAINGER

Home | Order Form | Compare Items | Register | Your Account | Help

Repair Parts | Services | Resources | Company Info | Contact Us | Find A Branch | Worldwide Catalog No. 396 (PDF)  Keyword(s)  Advanced Search

LOG IN

User ID

Password

☐ Remember my login
more

Item Details  < Back

Electrical > Batteries > Rechargeable

Battery,Rechargeable
Rechargeable Battery, Voltage Rating 18 Volts, Power Plus Battery

| | | | |
|---|---|---|---|
| Grainger Item: | 5PP50 | Ship Qty: | 1 |
| Price (ea): | $79.00 | Sell Qty (Will-Call): | 1 |
| Manufacturer: | MILWAUKEE ACCESSORIES | Usually Ships: | Today |
| | | Catalog 396 Page: | 1257 |
| Mfg. Model#: | 48-11-2230 | | |
| Ship Weight (lbs): | 2.6 | | |

Qty.

[Add to Personal List] [Add to Order]

[Compare Alternates]

Price shown may not reflect your price. Log-in above, or click here to register.

NOTES & RESTRICTIONS
See Catalog 396 Page for application and/or safety information.

ALTERNATE PRODUCTS
Battery,18.0 Vdc,2 Pk
Nickel Cadmium Battery, Voltage 18 VDC, For Use With Milwaukee Power Plus 18.0 Volt Tools and Accessories, Battery Capacity 2.4 AH, Package 2

Price (pk): $139.00   Usually Ships: Today
Grainger Item# 4YE47

Qty.

[Add to Personal List] [Add to Order]

[Compare Alternates]

OPTIONAL ACCESSORIES
Charger,12vdc,Input
One Hour Vehicle Charger, Use With 12V DC Outlets In Cars

| TECHNICAL SPECIFICATIONS | |
|---|---|
| Voltage | 18.0 Volt Power Plus and Lok-Tor Batteries |
| For Use With | All 18.0 Volt Power Plus Lok-Tor Tools and Work Light |
| Battery Capacity (AH) | 2.4 |

FIGURE 16

SYSTEM AND METHOD FOR PROVIDING A RESPONSE TO A SEARCH QUERY

BACKGROUND

The following relates generally to e-commerce and, more particularly, relates to a system and method for providing a response to a search query.

Systems and methods for searching electronic product catalogs for the purpose of facilitating e-commerce are well known in the art. In this regard, many online merchants commonly provide search engines for assisting customers in locating items from an online catalog. For example, as described in the background section of U.S. Pat. No. 6,144,958, to perform a search using a search engine, a user submits a query containing one or more search terms. The query may also explicitly or implicitly identify a record field to be searched, such as a title, author, subject classification, model number, etc. of the item. A query server program of the search engine then processes the query to identify any items that match the query. The set of items identified by the query server program is referred to as the "query result," and is commonly presented to the user as a list of the located items.

When the user of a search engine, however, enters a search term in an attempt to locate an item that is not within an electronic catalog, many search engines will simply return a null (empty) search result. The user frustration that arises from the presenting of null search results is a significant problem for online vendors. For example, null search results may lead to the loss of current and/or future sales by an online vendor.

In circumstances where an online vendor does not offer for sale an item a user is looking for, it is also known in the art to assist users in locating other vendors for the item of interest. For example, U.S. Pat. No. 6,785,671 describes a system that assists users in locating Web sites or Web pages from which a user-specified item may be purchased. To this end, the system utilizes a Web crawler program to retrieve Web pages which are evaluated, according to a set of content-based rules, to generate a score that indicates a likelihood that the Web page includes an offering for the user-specified item. The user may then be presented with a search result from which the user can navigate to those Web page(s) of vendor(s) that have been determined to likely include an offering for the user-specified item. It will be appreciated that redirecting sales to other vendors is also generally undesirable as it again may lead to the loss of current and/or future sales by an online vendor, e.g., the user may, in the future, proceed directly to the other vendor when desiring to purchase an item.

SUMMARY

To address these and other problems associated with known methods for facilitating the online sales of items, disclosed hereinafter is a system and method that responds to a search for an item in which the search request specifies a query term that would normally result in a null search. More particularly, the described system receives a request to search an electronic catalog of a vendor which specifies a query term. The query term is used to search an electronic catalog of a third party. The results obtained by searching the electronic catalog of the third party are parsed to uncover a keyword recognized by a search engine associated with the electronic catalog of the vendor. The uncovered keyword is then used in the search engine associated with the electronic catalog of the vendor to locate one or more items in the electronic catalog of the vendor. Items located in this manner are the search results responsive to the query term. Thus, the described system and method provides a mechanism for translating a first search request having what would normally be an unrecognized query term, i.e., one which would normally return a null search result, into a search request having a recognizable query term and, furthermore, may utilize the vast resources of the Internet/world wide web as the effective translating engine.

A better understanding of the objects, advantages, features, properties and relationships of the system and method described hereinafter will be obtained from the following detailed description and accompanying drawings which set forth illustrative embodiments which are indicative of the various ways in which the principles of the invention may be employed.

BRIEF DESCRIPTION OF THE DRAWINGS

For a better understanding of the described system and method for providing a response to a search query, reference may be had to preferred embodiments shown in the following drawings in which:

FIG. 6 illustrates an exemplary, parsed search result page retrieved using a spidering program;

FIG. 7 illustrates exemplary data maintained within an electronic database of a vendor;

FIGS. 8 and 9 illustrate exemplary keyword indices;

FIGS. 10 and 15 illustrate a screen shot of a search result page retrieved from a third party Web site using a spidering program;

FIGS. 13, 14, and 16 illustrate exemplary alternative search results pages including products from the catalog of the vendor.

DETAILED DESCRIPTION

Figure 1:
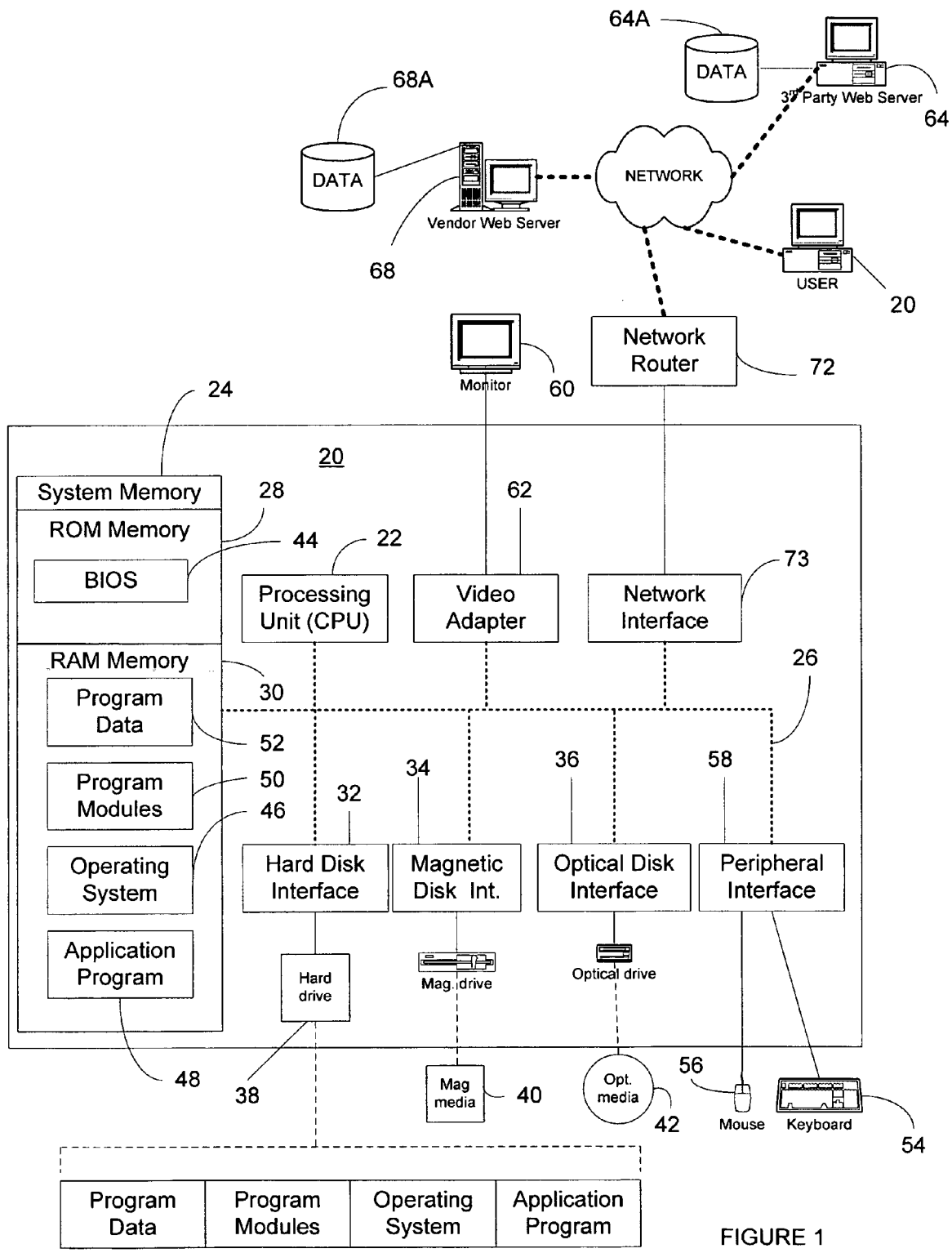
FIG. 1 illustrates an exemplary computer system in which the principles of the described invention may be employed.

Turning to the drawings, wherein like reference numerals refer to like elements, an exemplary system and method for providing a response to a search query is described. In particular, as illustrated in FIG. 1, the system and method will be described in the context of a plurality of processing devices linked via a network, such as the World Wide Web or the Internet. In this regard, a processing device 20, illustrated in the exemplary form of a computer system, is provided with executable instructions to, for example, provide a means for a user to access a vendor server 68 and thereby perform a search for items. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant ("PDA"), cellular telephone, or the like. Furthermore, while described and illustrated in the context of a single processing device 20, those skilled in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. By way of further example, the bus 26 may include an architecture having a North Bridge and a South Bridge where the North Bridge acts as the connection point for the processing unit 22, memory 24, and the South Bridge. The North Bridge functions to route traffic from these interfaces, and arbitrates and controls access to the memory subsystem from the processing unit 22 and I/O devices. The South Bridge, in its simplest form, integrates various I/O controllers, provides interfaces to peripheral devices and buses, and transfers data to/from the North bridge through either a PCI bus connection in older designs, or a proprietary interconnect in newer chipsets.

As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example, via a network connection.

An end-user may enter commands and information into the processing device 20 through input devices such as a keyboard 54 and/or a pointing device 56. While not illustrated, other input devices may include a microphone, a joystick, a game pad, a scanner, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

The processing device 20 may also utilize logical connections to one or more remote processing devices, such as a Web servers 64, 68 having associated data repositories. In this regard, while the remote processing devices 64, 68 have been illustrated in the exemplary form of a computer, it will be appreciated that the remote processing devices 64, 68 may be any type of device having processing capabilities. Again, it will be appreciated that the remote processing devices 64, 68 need not be implemented as a single device but may be implemented in a manner such that the tasks performed by the remote processing devices 64, 68 are distributed to a plurality of processing devices linked through a communication network For performing tasks as needed, the remote processing devices 64, 68 may include many or all of the elements described above relative to the processing device 20. By way of further example, the remote processing device 68 may include the executable instructions for handling search requests and providing search results with the processing device 20 being a thin client or a simple input/output device. Communications between the processing device 20 and the remote processing device 64 may be exchanged via a further processing device, such a network router 72, that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) of the remote processing device 64.

Figure 2:
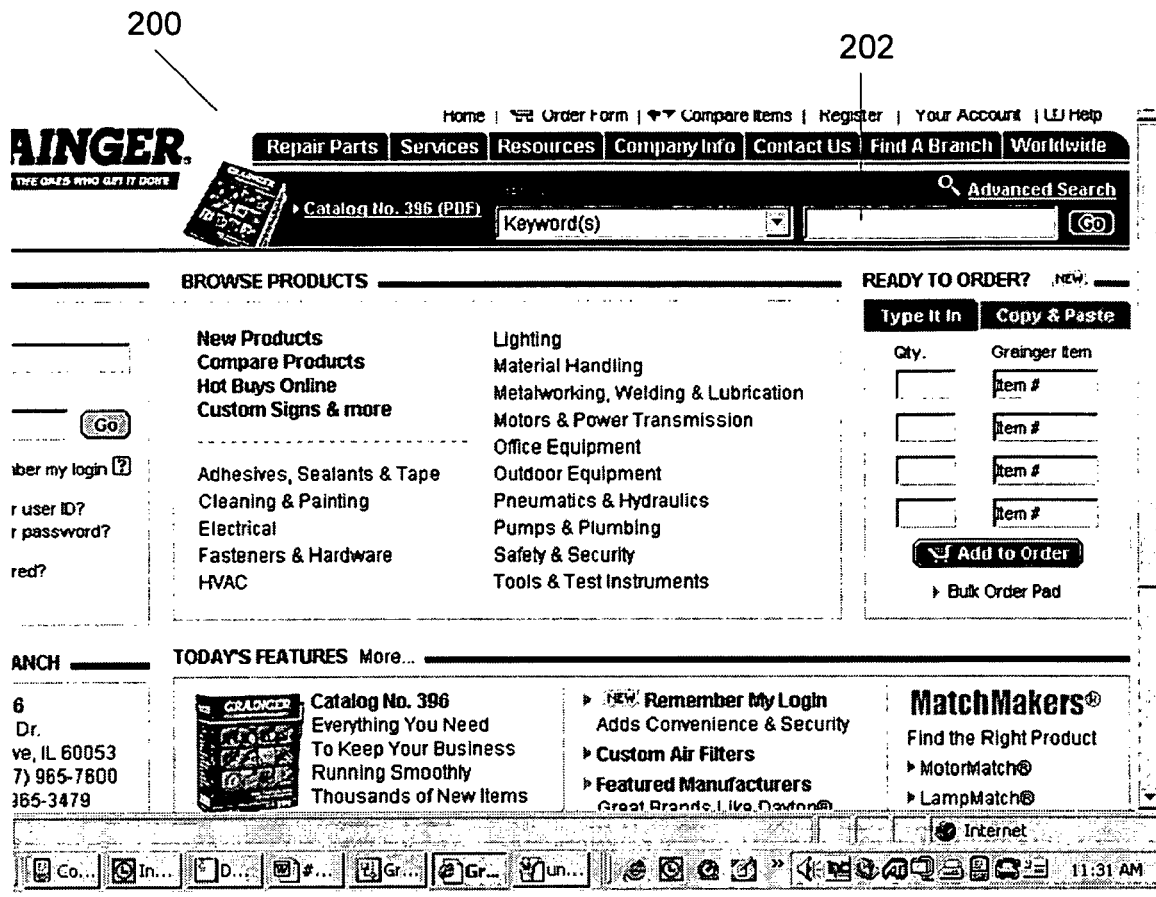
FIG. 2 illustrates a screen shot of an exemplary Web page having a query entry field.

For providing a product alternative in response to a search query, a user first uses an input device to provide a search query term to the system. By way of illustration, a user may access the Web site of a vendor by establishing communications with the vendor server 68 via the network. Upon establishing contact with the vendor server 68, the user may then be presented with (or navigate to) a search entry Web page 200, an example of which is illustrated in FIG. 2. More particularly, the search entry Web page 200 provides a graphical user interface element 202 by which a user can use an input device to enter a freeform query term, e.g., a product name, product descriptor, product manufacturer, product stock keeping unit ("SKU") number, etc.

Figure 3:
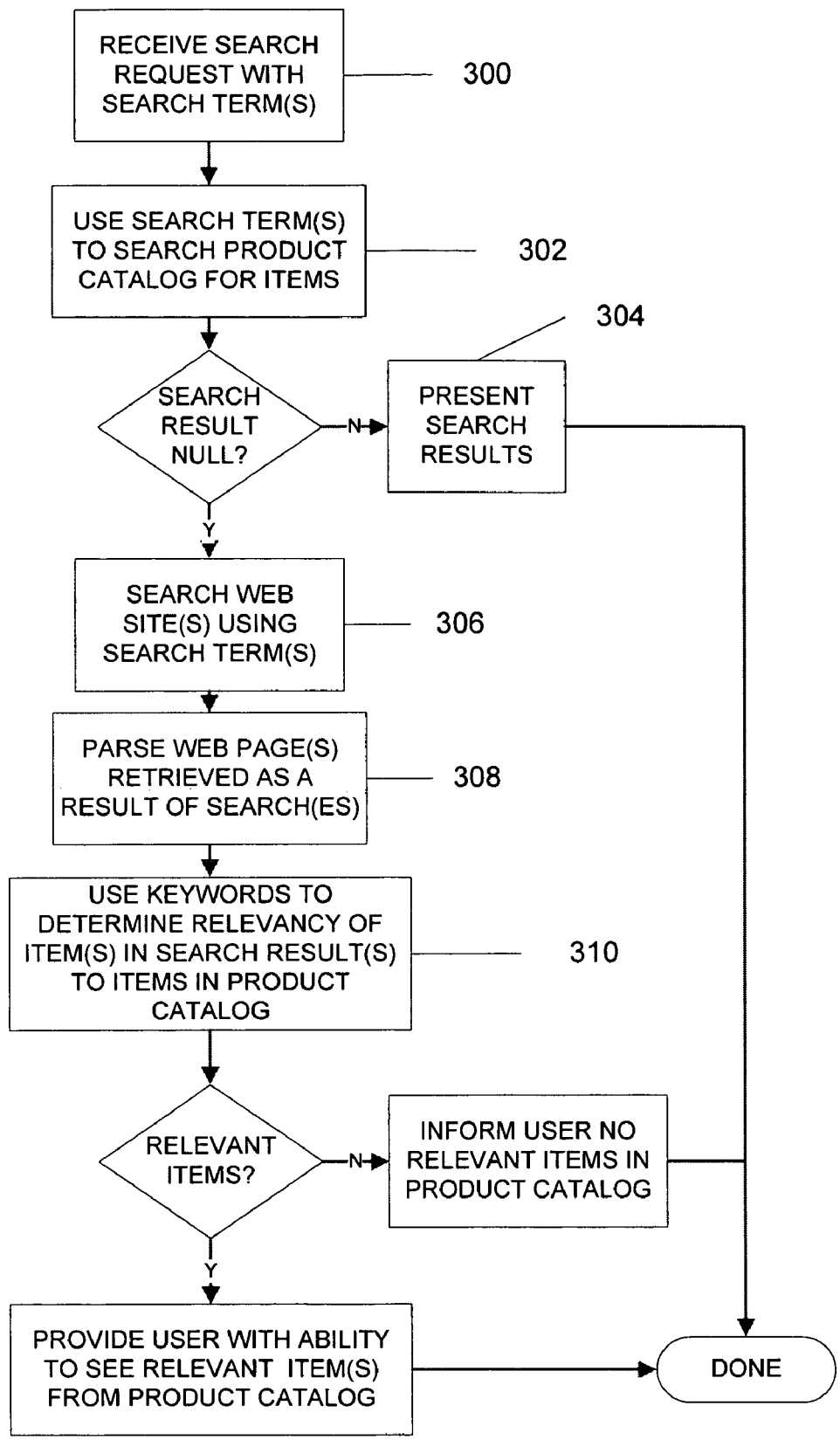
FIG. 3 illustrates a flow chart diagram of an exemplary method for providing product alternative(s) in response to a search query.
Figure 4:
FIG. 4 illustrates an exemplary null search results page.

Once a query term is entered 300, a search engine associated with the vendor Web site 68 may, as illustrated in FIG. 3, perform a query 302 to determine if the electronic product catalog of the vendor, e.g., product related data stored in database 68A, includes any entries that might satisfy the query requested by the user. In the event that the search performed by the search engine does uncover one or more entries in the electronic product catalog of the vendor which satisfy the freeform query requested by the user, the results of the search my be presented to the user in keeping with conventional practice 304. In the event, however, that the search performed by the search engine does not uncover one or more entries in the electronic product catalog of the vendor which satisfy the freeform query requested by the user, rather than immediately present to the user a "null search" page, an example of which is illustrated in FIG. 4, further processing may be performed, in the various manners described below, to generally provide the searching user with one or more alternatives to those items the user may have been searching for.

Figure 5:
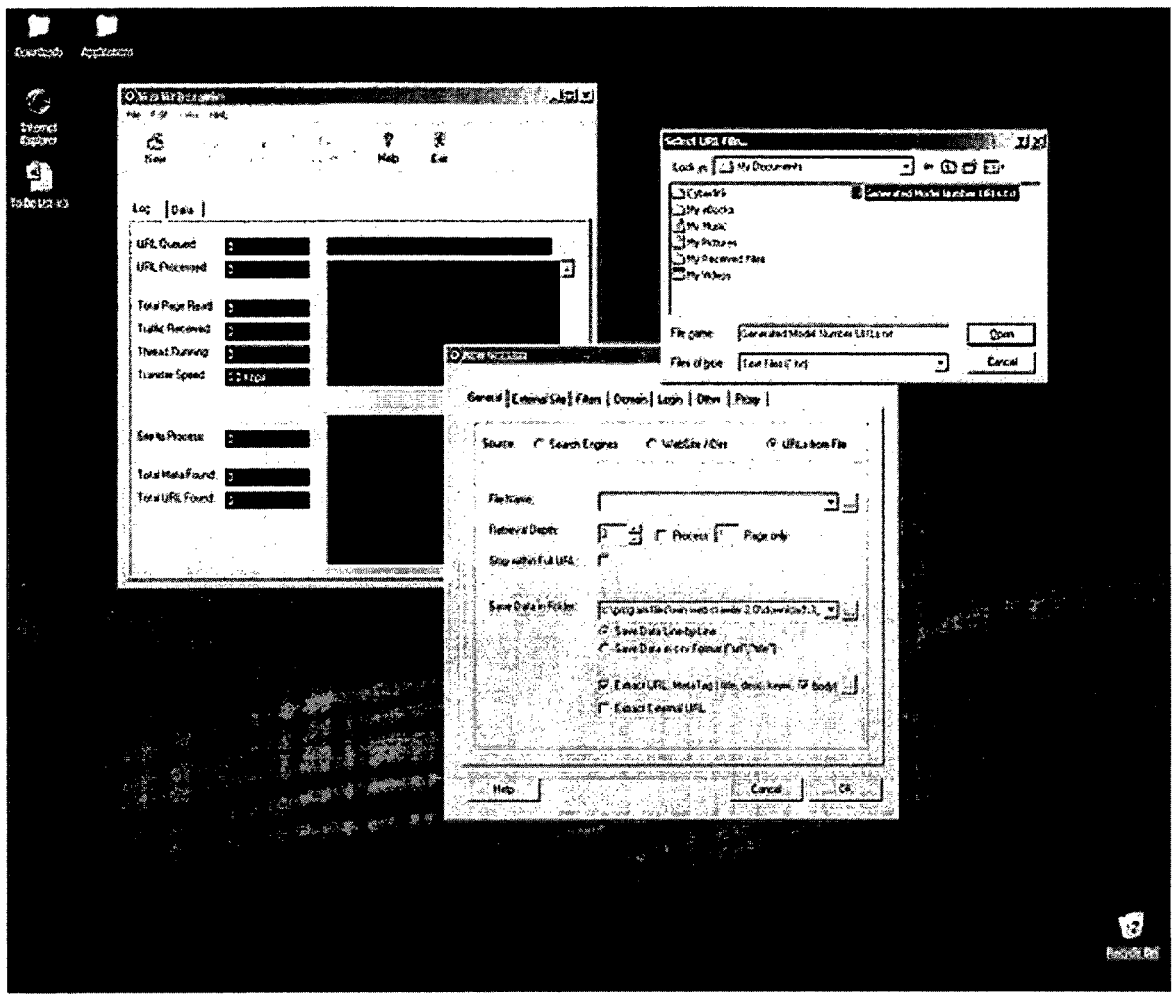
FIG. 5 illustrates screen shots of an exemplary spidering program.

When the search performed by the search engine does not uncover one or more entries in the electronic product catalog of the vendor which satisfy the freeform query requested by the user, a further search may be initiated over the network for the purpose of trying to identify what item or items the user may have been actually searching for. To this end, the further search may include the searching 306 of a third party database 64A associated with a third party server 64 using a network searching tool, such as a conventional Internet spidering program, an example of which is illustrated in FIG. 5. It will be appreciated that the searching tool may also be a program which utilizes APIs (application program interfaces) associated with the third party database, etc.

To search the third party database 64A in keeping with the illustrated example, the freeform query term(s) entered by the user may be utilized as the argument(s) supplied to the network searching program. By way of example, in the case where the user entered the freeform query term "40245," which would normally result in a "null" search as illustrated in FIG. 4, the search tool may be used to search for item(s) within the third party database 64A which may have some relationship within the third party database 64A to the user-provided term "40245." In this illustrated example, the third party Web site 64 might be "froogle.com" and the search tool may perform the search of the database 64A associated with the third party Web site 64 by posting the following to the network: "http://www.google.com/froogle?q=40245" As will be appreciated, the third party Web site 64 will respond to the search request provided by the search tool by returning relevant search results, if any. It will be further appreciated that, in the event that the third party Web site 64 fails to return any search results, or any search results determined to be relevant, further searches of further third party Web sites may be performed in a similar manner.

Considering now the search results returned from the third party Web site 64, in the event that the search results are in the form of a mark-up language formatted page, it is preferred, although not required, that the mark-up language formatted page be parsed 308 to thereby strip mark-up language page tags from the returned search results. Thereafter, the remaining text, an example of which is illustrated in FIG. 6, may be searched 310 to determine if the remaining text includes any information that may be relevant to the initial query entered by the user. This relevancy determination would typically consider the products/items that the vendor normally sells.

To determine if the search of the third party Web site 64 uncovered any relevant information, the text of the search results returned from the third party Web site 64 may be searched for occurrences of keywords. These keywords may be keywords that also appear within the electronic product catalog of the vendor (for example FIG. 7 illustrates the long description file of two product "SKUs"—1A004 and 1A005), are index words used to find products in the product catalog of the vendor (for example FIGS. 8 and 9 illustrate a descriptor index and a brand name index, respectively), or the like. Furthermore, the text of the search results returned from the third party Web site 64 may be searched (manually or by means of a computer program) to look for indicators that are typically found as transitions between items when more than one item is included within the returned search results. The transition indicators are useful to allow text in the search results to be associated with individual items. For example, as seen in FIG. 6, the text word "price value=" may serve to indicate an end to the data related to one item and the transition to data related to another item (for aide of reference, FIG. 10 illustrates a mark-up language page displayed in a browser which corresponds to the parsed text file of FIG. 6 where it can be seen that the displayed price follows item description data). Transition indicators may also be recognized in one or more mark-up language tags found within a returned mark-up language document. Keyword(s) found in an item descriptor in the returned search results may then be utilized to provide the user with the ability to find the product(s) they may have been interested in when the search process was commenced.

Figure 13:

By way of illustration, when the user entered the search term "40245" the search results of FIG. 6 were returned from the third party Web site. Within these returned search results, at least the data associated with the first item, the "Akro-Mils Divider For Bin" (see FIG. 10) includes vendor keywords, i.e., keywords relevant to the product catalog of the vendor, namely, "Akro-Mils" and "bin." Using these keywords, the product catalog of the vendor may then be re-queried to provide product alternatives (or the actual product the user was looking for but using an original keyword that was unrecognized by the vendor system). By way of example, FIG. 13 illustrates a page which presents to the user "Akro-Mils" products in the catalog of the vendor which products were uncovered through a search of the vendor catalog using the "Akro-Mils" keyword found in the Internet search results as a new search query term provided to the search engine. Similarly, FIG. 14 illustrates a page which presents to the user "bin" products in the catalog of the vendor which were products were uncovered through a search of the vendor catalog using the "bin" keyword found in the Internet search results as a new query term provided to the search engine.

In the case where multiple recognized keywords are found in the Internet search results, the user may be prompted to further direct the user towards the search results that the user might consider to be most meaningful. For example, the user may be prompted with the following in keeping with the above-example, "Did you mean to search for Akro-Mils?" and/or "Did you mean to search for bins?" This further guidance may be utilized in-lieu of presenting the user with the search results obtained using all recognized keywords.

Figure 15:

As a further example, in response to a user originally entering a search query "48-11-2230," which keyword in this example is not recognized by the vendor search system and which would normally result in a "null search" result, the subject system would search the third party Web site using the query term "48-11-2230," retrieve the search results (an example of which is illustrated in FIG. 15), examine the search results for recognized keywords and item transition points (in this example both "Milwaukee" and the parametric or units of measure "UOM" of "18 volt" would be recognized keywords), use the recognized keywords to re-query the vendor catalog, and return search results such as illustrated in FIG. 16.

Figure 12:
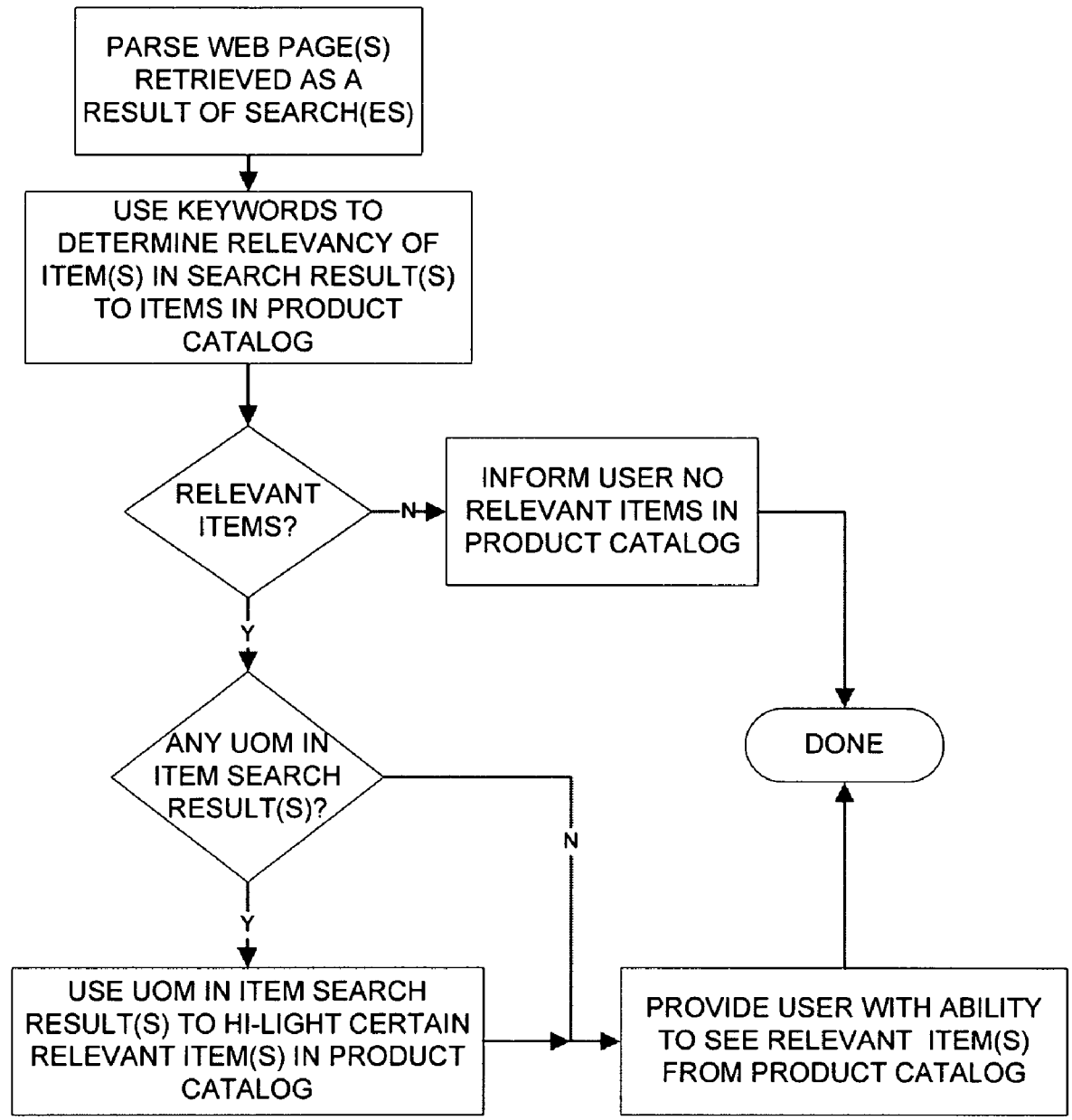
FIG. 12 illustrates a flow chart of an exemplary method for providing product alternatives considering a product parametric.

In some instances, it may be desired to allow a representative of the vendor to examine the results obtained by using this process to provide, for example, a relevancy weight to the obtained results. Using this relevancy weight, items from the vendor catalog may be presented to the user in an ordered fashion, e.g., with those deemed most likely to be what the user was searching for presented at a top of an ordered list, high-lighted, etc. The ranking of the ultimate search results may also be performed by providing weights to the keywords uncovered in the Internet search results. For example, search results obtained using an SKU as a re-query term may be given a first ranking level, search results obtained using a brand name keyword as a re-query term may be given a second ranking level, and search results obtained using a product parametric descriptor as a re-query term may be given a third ranking level. Still further, when UOMs are specified in the original query entered by the user (which UOM may be utilized as part of the Internet searching process or stripped prior to the Internet searching process) or when UOMs are found in the results returned from an Internet search, the UOM may be also be utilized to rank the relevancy of search results as illustrated in FIG. 12. For example, if the user specified "18 Volts" in the original query with "48-11-2230," the one product sold by the vendor meeting all of the keywords found in the Internet search result item which also meets the specified "18 Volts" is provided to the user, as illustrated in FIG. 16. Still further, if the user specified, for example, "15 Volts" in the original query with "48-11-2230" or "15 Volts" was returned as an Internet search result item, the vendor items having a UOM close to 15 Volts may be presented to the user as search results as alternatives, e.g., the 18 Volt product illustrated in FIG. 16.

Figure 11:
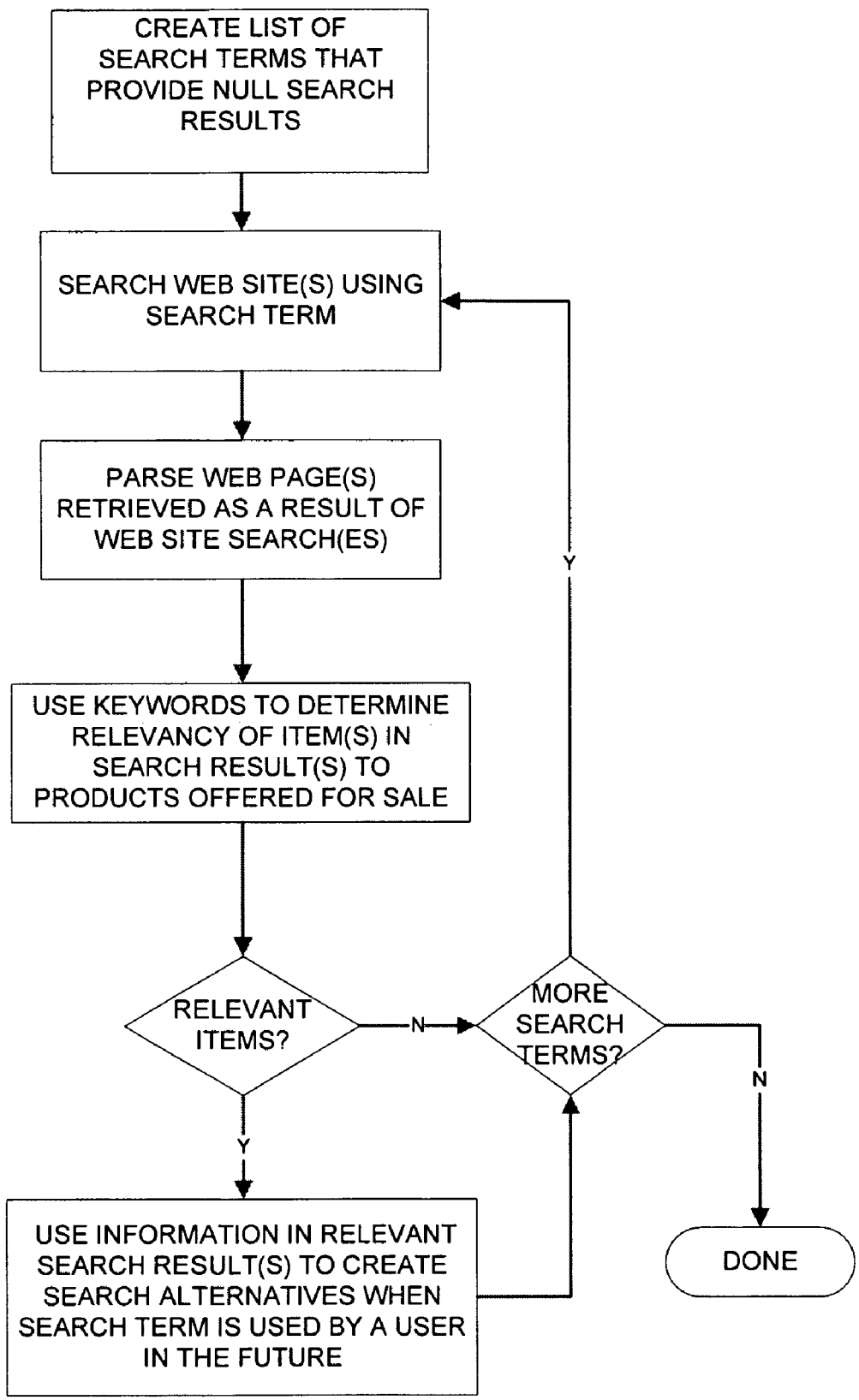
FIG. 11 illustrates a flow chart of an exemplary method for identifying product alternatives using a batch process.

In yet another embodiment, the vendor Web site 68 may maintain a list of all keywords entered over a given period of time that resulted in a null search and then perform the search of the Internet in a batch process to identify product alternatives in keeping with the above-described process. In this manner, as illustrated in FIG. 11, a look-up table may then be created and maintained such that, when that keyword is entered into the search engine in the future, rather than provide a null search result, a positive search result is provided. For example, if "40245" were a search term that originally resulted in a null search, the query term "40245" could be used as a term in the batch Internet searching process where the recognized keywords "Akro-Mils" and "bin" would be uncovered for the query term "40245" and mapped to the query term "40245." Then, when the query term "40245" is entered in the future by a user, the system may prompt the user with "Did you mean to search for Akro-Mils?" and/or "Did you mean to search for bins?" since the recognized query terms "Akro-Mils" and "bins" (or results of already performing this query) have been mapped to the previously unrecognized query term "40245." Thus, the query of the third party site may be performed to reduce future "null" searches rather than in near real-time as described previously.

It will be additionally appreciated that the input into the system may be, for example, a customer master file, i.e., a file which details products a customer is interested in purchasing which may include product SKUs, parametric values, and other product descriptors. In one case, the customer master file may be treated as if it were the returned Internet search results, namely, it may be parsed to look for keywords and item transitions with the keywords then being used to search the vendor catalog for products. In another case, the customer master file may be parsed and the data terms within the customer master file may be utilized as the initial search terms, i.e., where terms are unrecognized, an attempt may be made to translate those terms using the network (to access a remote data repository) to find recognizable keyword equivalents to those terms for use in the searching process.

While specific embodiments of the invention have been described in detail, it will be appreciated by those skilled in the art that various modifications and alternatives to those details could be developed in light of the overall teachings of the disclosure. For example, it will be appreciated that the initial search request may originate via a phone call, email, etc. issued to an IVR (interactive voice response) system, a sales representative, automated email parser, etc. The initial search request could also originate using any input device such as a scanner. Still further, possible results could be communicated back to the user orally, by email, etc. Accordingly, the particular arrangement disclosed is meant to be illustrative only and not limiting as to the scope of the invention which is to be given the full breadth of the appended claims and any equivalents thereof.

All patents, patent applications, and other references cited within this document are hereby incorporated by reference in their entirety.

What is claimed is:

1. A computer readable media having stored computer executable instructions for providing a search result, the instructions performing steps comprising:
   receiving a request to search a database of a vendor which specifies a query term;
   using the received query term to search a database associated with a server of a third party;
   parsing the results obtained by searching the database associated with the server of the third party to uncover a keyword recognized by a search engine associated with the database of the vendor;
   using the uncovered keyword as input to the search engine associated with the database of the vendor to locate one or more items in the database of the vendor; and
   providing the items in the database of the vendor located as a result of using the uncovered keyword as input to the search engine associated with the database of the vendor as the search result responsive to the query term.

2. The computer readable media as recited in claim 1, comprising a spidering program to search the database associated with the server of the third party.

3. The computer readable media as recited in claim 1, wherein the instructions rank the one or more items in the database of the vendor located as a result of using the uncovered keyword as input to the search engine associated with the database of the vendor according to a deemed relevancy.

4. The computer readable media as recited in claim 3, wherein the relevancy is determined based upon a type of the keyword recognized by the search engine associated with the database of the vendor.

5. The computer readable media as recited in claim 1, wherein the query term is entered into a Web page.

6. The computer readable media as recited in claim 1, wherein the query term is provided via an email.

7. The computer readable media as recited in claim 1, wherein the query term is provided via an IVR system.

8. The computer readable media as recited in claim 1, wherein the instructions parse the results obtained by searching the database associated with the server of the third party to uncover delimiters to distinguish between multiple items in results obtained by searching the database associated with the server of the third party.

9. The computer readable media as recited in claim 1, wherein the instructions use the query term to search the database associated with the server of the third party following the use of the query term in the search engine associated with the database of the vendor and a null search result being obtained.

10. The computer readable media as recited in claim 1, wherein the database of the vendor comprises an electronic product catalog.

11. A computer readable media having stored computer executable instructions for providing a search result, the instructions performing steps comprising:

receiving at a computer for use with a search engine a request to search a first database which specifies a first query term which is unrecognized by the search engine;

accessing a second database associated with a server of a third party via a network and using the first query term to find a second query term extracted from the second database as a result of using the first query term which is recognized by the search engine;

using the second query term as input to the search engine to perform a search of the first database; and providing results obtained from the search of the first database using the second query term as input to the search engine as the search result responsive to the first query term.

12. The computer readable media as recited in claim 11, wherein the instructions store a mapping between the first query term and second query term extracted from the second database through use of the first query term to thereby eliminate the need for performing the step associated with accessing the second database via the network should the first query term be again received in a request to search the database.

13. The computer readable media as recited in claim 11, wherein the second query term which is recognized by the search engine is maintained within a keyword list.

14. The computer readable media as recited in claim 11, wherein the network comprises the Internet.

15. The computer readable media as recited in claim 14, wherein the first database comprises a vendor database.

* * * * *